UNITED STATES PATENT OFFICE.

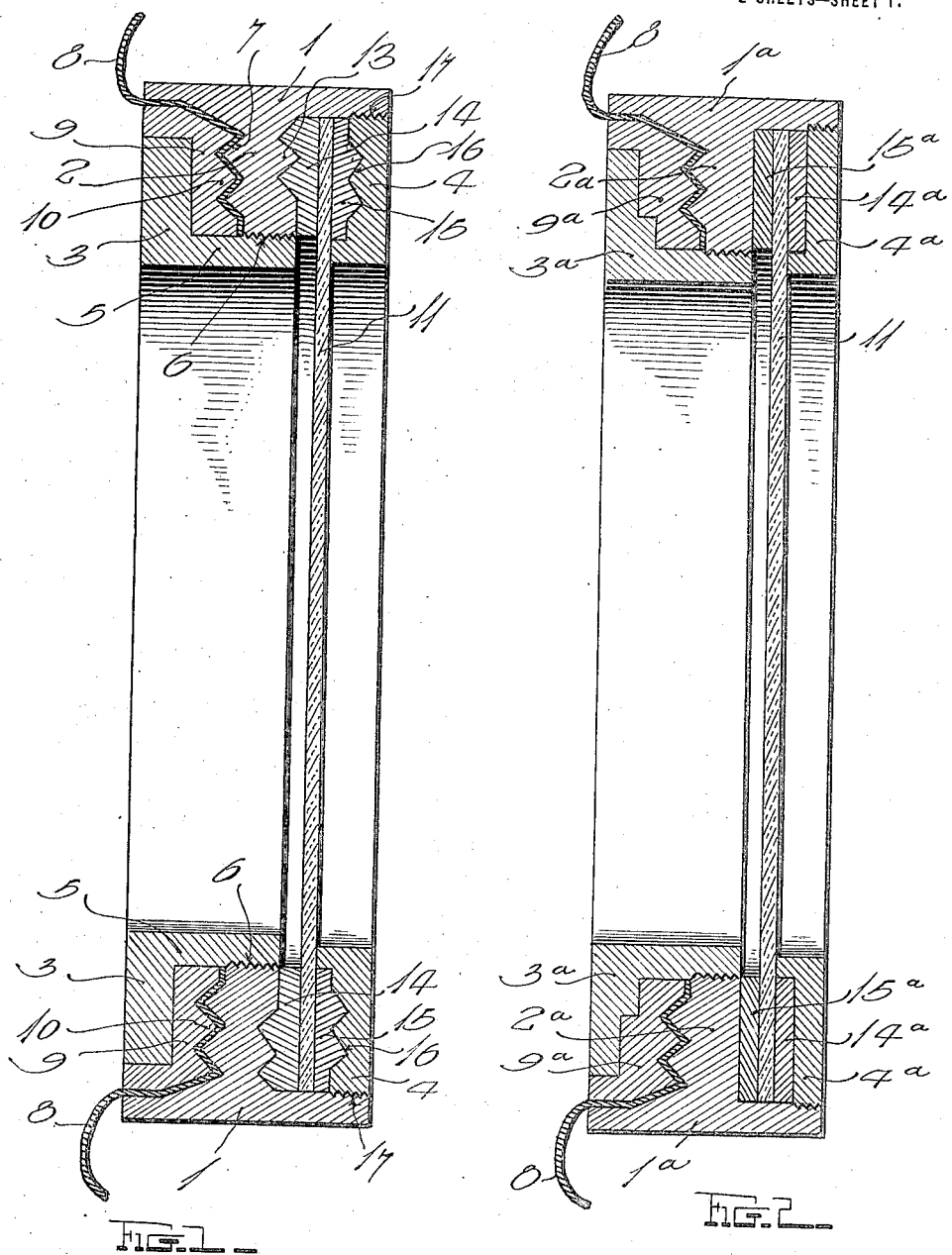

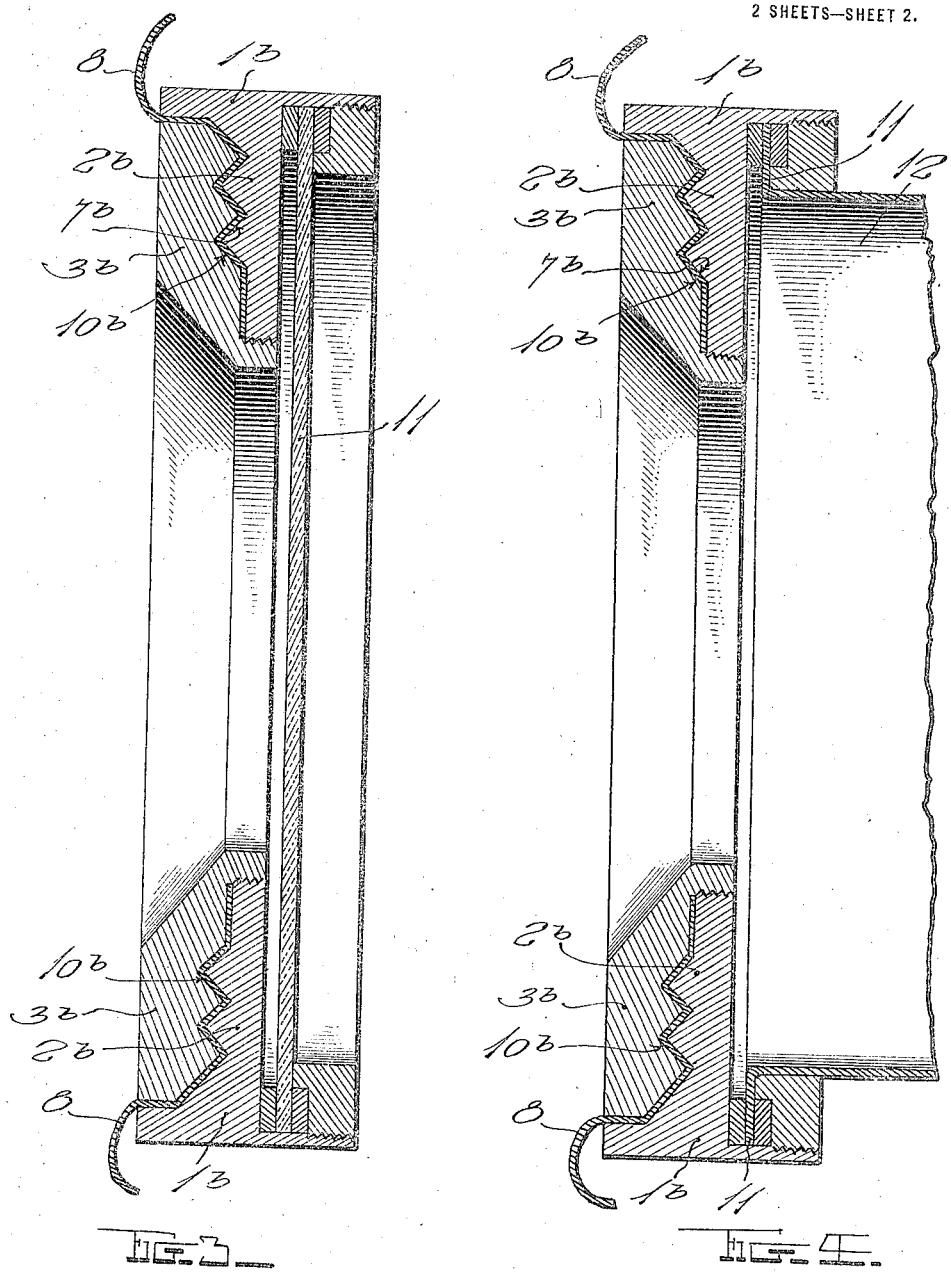

FREDERICK K. PIERCE, OF JERSEY CITY, NEW JERSEY.

COUPLING.

1,301,737.  Specification of Letters Patent.  Patented Apr. 22, 1919.

Application filed December 6, 1917. Serial No. 205,785.

*To all whom it may concern:*

Be it known that I, FREDERICK K. PIERCE, a citizen of the United States, residing at Jersey City, in the county of Hudson and State of New Jersey, have invented certain new and useful Improvements in Couplings; and I do declare the following to be a full, clear, and exact description of the invention, such as will enable others skilled in the art to which it appertains to make and use the same.

My invention has for its object to provide an extremely simple yet a highly efficient and durable coupling for connecting numerous elements with a piece of flexible material in a gas and dust tight manner, and with this general object in view, the invention resides in the novel features of construction and unique combinations of parts to be hereinafter fully described and claimed, the descriptive matter being supplemented by the accompanying drawings which form a part of this specification and in which:

Figures 1, 2 and 3 are sectional views showing three different types of my invention; and Fig. 4 is a sectional view showing a different use thereof.

In Fig. 1, the numeral 1 designates a ring whose outer and inner surfaces are substantially parallel to its axis, the inner side of said ring being equipped with an integral annular flange 2 located between its edges and preferably parallel with the planes in which such edges are located. A clamping ring 3 is provided for securing the flexible material against one side of the flange 2, while a second clamping ring 4 is employed for securing the element to be attached in tight engagement with the opposite side of said flange.

The body portion of ring 3 is parallel with flange 2 and the inner edge of said ring is provided with an integral lateral flange 5 of annular formation, said flange 5 having a threaded engagement at 6 with the inner edge of the flange 2. The first named side of said flange 2 is provided with V-shaped annular corrugations 7 against which the sheet 8 of flexible material is adapted to bear, a gasket 9 being interposed between the edge of said sheet and the ring 3. This gasket is provided with corrugations 10 which coact with those above described in effectively gripping the flexible material and preventing any possibility of fluid or dust passing through the joint.

The material 8 shown in the drawings may be a part of a gas mask, an oxygen helmet, a smoke helmet, a sand blaster's helmet, a gas bag, etc. The element 11 may be a portion of a respirator, a lens or other view glass, etc., or a flange on the end of a tube 12 as depicted in Fig. 4. This tube is usually employed in connection with a gas bag for either supplying the same with gas or conducting it therefrom and in either case the improved joint will be effective for preventing leakage.

The side of flange 2 opposite the side thereof above described, is provided with corrugations 13 engaged by similar corrugations on a gasket 14 interposed between said flange and the element 11, an additional gasket 15 being located between said element and the clamping ring 4. Gasket 15 and ring 4 are also provided with interengaging corrugations 16 and the edge of said ring is threaded into the ring 1 as shown at 17. By this arrangement, tightening of ring 4 will clamp the element 11 between the gaskets 14 and 15 in such a manner as to prevent any possibility of leakage.

In the form of the invention shown in Fig. 2, the ring 1$^a$ is provided with an annular flange 2$^a$ corrugated only on one side for engagement with the flexible material 8, a gasket 9$^a$ and an angular clamping ring 3$^a$ being provided for holding said material. The opposite side of flange 2$^a$ is provided with no corrugations and flat gaskets 14$^a$ and 15$^a$ contact with opposite sides of the element 11, said last named gasket contacting with the clamping ring 4$^a$.

Fig. 3 illustrates a somewhat simplified form of the invention. In this figure, the ring 1$^b$ is provided with an annular flange 2$^b$ having corrugations 7$^b$ on one side, but rather than provide a gasket such as 9—9$^a$, the clamping ring 3$^b$ is provided with corrugations 10$^b$ coacting with the corrugations 7$^b$ in effectively clamping the flexible material 8. The construction employed for clamping the element 11 against the flange 2$^b$ is the same as that illustrated in Fig. 2 and needs no further description, but it will be obvious that the arrangement shown in Fig. 1 could well be used if required.

From the foregoing, taken in connection with the accompanying drawing, it will be obvious that I have provided a comparatively simple coupling for connecting practically any element to a flexible piece of material in such a manner as to provide a tight joint which will exclude gas, dust, etc. All of the uses of the invention need not be enumerated, but it is to be understood that it is not restricted to any particular field or fields.

Since probably the best results are obtained from the several specific details shown and described, they are preferably employed, but within the scope of the invention as claimed, numerous minor changes may well be made.

I claim:—

1. A coupling for clamping an element to a sheet of flexible material, comprising a ring widened in a direction parallel to its axis, said ring having between its edges an inwardly extending annular flange provided at its inner edge with screw threads, the inner side of said ring at one side of said flange also having screw threads, a second ring whose edge is provided with threads interengaging said threads of the first named ring, said second ring serving to clamp the aforesaid element against one side of said flange, and a third ring for clamping the flexible sheet against the other side of said flange, said third ring being L-shaped in transverse section with one flange substantially parallel to said inwardly extending flange and with its other flange provided with screw threads engaging the threads of said first named flange.

2. A coupling for clamping an element to a sheet of flexible material, comprising a ring widened in a direction parallel to its axis, said ring having between its edges an inwardly extending annular flange provided at its inner edge with screw threads, the inner side of said ring at one side of said flange also having screw threads, a second ring whose edge is provided with threads interengaging said threads of the first named ring, said second ring serving to clamp the aforesaid element against one side of said flange, and a third ring for clamping the flexible sheet against the other side of said flange, this side of the flange having circumferential corrugations, a corrugated washer for holding the flexible sheet against the corrugated side of said flange, said washer being L-shaped in transverse section with one flange spaced inwardly from said first-named ring and having corrugations on its other flange, said washer being held in place by said third ring, said third ring being L-shaped in transverse section with one flange received in the angle between the flanges of said washer, and with its other flange threaded to engage with the threads of said first named flange.

In testimony whereof I have hereunto set my hand.

FREDERICK K. PIERCE.

Copies of this patent may be obtained for five cents each, by addressing the "Commissioner of Patents, Washington, D. C."